US009454299B2

(12) United States Patent
Rainisto

(10) Patent No.: US 9,454,299 B2
(45) Date of Patent: Sep. 27, 2016

(54) METHODS, APPARATUS, COMPUTER-READABLE STORAGE MEDIUMS AND COMPUTER PROGRAMS FOR SELECTING FUNCTIONS IN A GRAPHICAL USER INTERFACE

(75) Inventor: Roope Aleksi Rainisto, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1037 days.

(21) Appl. No.: 13/187,809

(22) Filed: Jul. 21, 2011

(65) Prior Publication Data
US 2013/0024808 A1 Jan. 24, 2013

(51) Int. Cl.
G06F 3/048 (2013.01)
G06F 3/0488 (2013.01)
G06F 3/0482 (2013.01)
G06F 3/0485 (2013.01)
G06F 3/0481 (2013.01)

(52) U.S. Cl.
CPC ........... *G06F 3/0488* (2013.01); *G06F 3/0482* (2013.01); *G06F 3/0485* (2013.01); *G06F 3/0481* (2013.01); *G06F 3/04812* (2013.01)

(58) Field of Classification Search
CPC .. G06F 3/0481; G06F 3/0482; G06F 3/0488; G06F 3/04812
USPC .......... 715/777, 810, 828, 821–823
See application file for complete search history.

(56) References Cited

U.S. PATENT DOCUMENTS

| | | | | |
|---|---|---|---|---|
| 5,473,745 A * | 12/1995 | Berry et al. | .................. | 715/788 |
| 5,757,371 A * | 5/1998 | Oran et al. | .................... | 715/779 |
| 6,057,844 A | 5/2000 | Strauss | .......................... | 345/358 |
| 6,433,801 B1 | 8/2002 | Moon et al. | .................. | 345/840 |
| 2004/0100479 A1 * | 5/2004 | Nakano | ................. | G06F 1/1626 715/700 |
| 2006/0026535 A1 * | 2/2006 | Hotelling | .............. | G06F 3/0418 715/863 |
| 2007/0245260 A1 * | 10/2007 | Koppert | .............. | G06F 3/04855 715/784 |
| 2008/0119237 A1 * | 5/2008 | Kim | .............................. | 455/566 |
| 2008/0177994 A1 * | 7/2008 | Mayer | ................................ | 713/2 |
| 2008/0178121 A1 * | 7/2008 | Cohen | .................. | G06F 3/0481 715/841 |
| 2008/0180408 A1 * | 7/2008 | Forstall et al. | ............... | 345/177 |
| 2008/0207188 A1 * | 8/2008 | Ahn | .................... | G06F 3/04847 455/418 |
| 2008/0259045 A1 | 10/2008 | Kim et al. | ..................... | 345/173 |
| 2009/0122018 A1 * | 5/2009 | Vymenets et al. | ............ | 345/173 |
| 2009/0228825 A1 * | 9/2009 | Van Os et al. | ................ | 715/780 |
| 2009/0271772 A1 * | 10/2009 | Stephenson et al. | ......... | 717/145 |
| 2009/0288044 A1 * | 11/2009 | Matthews | ............. | G06F 3/0482 715/863 |
| 2010/0007613 A1 * | 1/2010 | Costa | ............................ | 345/173 |
| 2010/0011310 A1 | 1/2010 | Rainisto | ........................ | 715/769 |
| 2010/0039399 A1 * | 2/2010 | Kim | ................................ | 345/173 |
| 2010/0105443 A1 | 4/2010 | Vaisanen | ....................... | 455/566 |
| 2010/0131880 A1 * | 5/2010 | Lee | ..................... | G06F 3/04817 715/769 |
| 2010/0199180 A1 * | 8/2010 | Brichter | ................ | G06F 3/0482 715/702 |
| 2010/0245268 A1 * | 9/2010 | Tamas et al. | .................. | 345/173 |
| 2010/0262938 A1 | 10/2010 | Woods | ........................... | 715/769 |

(Continued)

OTHER PUBLICATIONS http://www.youtube.com/wtach?v=CmI8FXOSN6c, Get Familiar with the Touch Screen.

*Primary Examiner* — Patrick Riegler
(74) *Attorney, Agent, or Firm* — Harrington & Smith

(57) ABSTRACT

A method including controlling display of a graphical user interface, the graphical user interface including a portion configured to present content associated with a program; controlling display of a plurality of functions in response to a user input, the plurality of functions being associated with the program and being displayed in the graphical user interface with the portion; and determining if the user input selects a function of the plurality of functions for execution.

14 Claims, 5 Drawing Sheets

(56) References Cited

U.S. PATENT DOCUMENTS

| | | | |
|---|---|---|---|
| 2010/0302172 A1* | 12/2010 | Wilairat | 345/173 |
| 2011/0016390 A1* | 1/2011 | Oh | G06F 3/0482 |
| | | | 715/702 |
| 2011/0072373 A1* | 3/2011 | Yuki | G06F 3/04817 |
| | | | 715/764 |
| 2011/0205163 A1* | 8/2011 | Hinckley et al. | 345/173 |
| 2011/0296341 A1* | 12/2011 | Koppert | G06F 3/04855 |
| | | | 715/786 |
| 2012/0210214 A1* | 8/2012 | Yoo | G06F 3/0482 |
| | | | 715/702 |
| 2012/0236037 A1* | 9/2012 | Lessing | G06F 3/017 |
| | | | 345/661 |
| 2012/0278732 A1* | 11/2012 | Lee et al. | 715/752 |

\* cited by examiner

METHODS, APPARATUS, COMPUTER-READABLE STORAGE MEDIUMS AND COMPUTER PROGRAMS FOR SELECTING FUNCTIONS IN A GRAPHICAL USER INTERFACE

TECHNOLOGICAL FIELD

Embodiments of the present invention relate to methods, apparatus, computer-readable storage mediums and computer programs. In particular, they relate to methods, apparatus, computer-readable storage mediums and computer programs in an electronic device.

BACKGROUND

Apparatus, such as mobile cellular telephones and tablet computers, usually include a display on which software applications may be displayed. The software applications may include content such as text and images and may be controlled by a user via one or more selectable functions. Users often wish to maximize the amount of content displayed on the display. However, the amount of content displayed may be restricted by the display of the selectable functions.

Therefore, it would be desirable to provide an alternative apparatus.

BRIEF SUMMARY

According to various, but not necessarily all, embodiments of the invention there is provided a method comprising: controlling display of a graphical user interface, the graphical user interface including a portion configured to present content associated with a program; controlling display of a plurality of functions in response to a user input, the plurality of functions being associated with the program and being displayed in the graphical user interface with the portion; and determining if the user input selects a function of the plurality of functions for execution.

The method may further comprise executing the selected function of the displayed plurality of functions in response to the user input.

The method may further comprise determining if the user input scrolls beyond an edge of the content by a predetermined amount, and wherein the plurality of functions may be displayed in response to determining that the user input scrolls beyond the edge of the content equal to, and/or greater than the predetermined amount.

The method may further comprise controlling display of a currently selected function of the plurality of functions with a first appearance, and controlling display of remaining functions of the plurality of functions with a second appearance, different to the first appearance.

Execution of a selected function may be performed in response to termination of the user input. The plurality of functions may be displayed at least partially within the portion. The graphical user interface may include one or more other portions configured to present content associated with other programs. The user input may correspond to a single gesture performed by an object.

The single gesture may include contacting a display with the object, moving the object whilst maintaining contact between the object and the display, and terminating the user input by removing contact between the object and the display.

The program may be a software application for a portable electronic device.

According to various, but not necessarily all, embodiments of the invention there is provided an apparatus comprising: at least one processor; and at least one memory including computer program code; the at least one memory and the computer program code configured to, with the at least one processor, cause the apparatus at least to perform: controlling display of a graphical user interface, the graphical user interface including a portion configured to present content associated with a program; controlling display of a plurality of functions in response to a user input, the plurality of functions being associated with the program and being displayed in the graphical user interface with the portion; and determining if the user input selects a function of the plurality of functions for execution.

The at least one memory and the computer program code may be configured to, with the at least one processor, cause the apparatus at least to perform: executing the selected function of the displayed plurality of functions in response to the user input.

The at least one memory and the computer program code may be configured to, with the at least one processor, cause the apparatus at least to perform: determining if the user input scrolls beyond an edge of the content by a predetermined amount, and wherein the plurality of functions are displayed in response to determining that the user input scrolls beyond the edge of the content equal to, and/or greater than the predetermined amount.

The at least one memory and the computer program code may be configured to, with the at least one processor, cause the apparatus at least to perform: controlling display of a currently selected function of the plurality of functions with a first appearance, and controlling display of remaining functions of the plurality of functions with a second appearance, different to the first appearance.

Execution of a selected function may be performed in response to termination of the user input. The plurality of functions may be displayed at least partially within the portion. The graphical user interface may include one or more other portions configured to present content associated with other programs. The user input may correspond to a single gesture performed by an object.

The single gesture may include contacting a display with the object, moving the object whilst maintaining contact between the object and the display, and terminating the user input by removing contact between the object and the display.

The program may be a software application for a portable electronic device.

According to various, but not necessarily all, embodiments of the invention there is provided a portable electronic device comprising an apparatus as described in any of the preceding paragraphs. The portable electronic device may further comprise a display.

According to various, but not necessarily all, embodiments of the invention there is provided a computer-readable storage medium encoded with instructions that, when executed by a processor, perform: controlling display of a graphical user interface, the graphical user interface including a portion configured to present content associated with a program; controlling display of a plurality of functions in response to a user input, the plurality of functions being associated with the program and being displayed in the graphical user interface with the portion; and determining if the user input selects a function of the plurality of functions for execution.

The computer-readable storage medium may be encoded with instructions that, when executed by a processor, perform executing the selected function of the displayed plurality of functions in response to the user input.

The computer-readable storage medium may be encoded with instructions that, when executed by a processor, perform, determining if the user input scrolls beyond an edge of the content by a predetermined amount, and wherein the plurality of functions are displayed in response to determining that the user input scrolls beyond the edge of the content equal to, and/or greater than the predetermined amount.

The computer-readable storage medium may be encoded with instructions that, when executed by a processor, perform controlling display of a currently selected function of the plurality of functions with a first appearance, and controlling display of remaining functions of the plurality of functions with a second appearance, different to the first appearance.

Execution of a selected function may be performed in response to termination of the user input. The plurality of functions may be displayed at least partially within the portion. The graphical user interface may include one or more other portions configured to present content associated with other programs. The user input may correspond to a single gesture performed by an object.

The single gesture may include contacting a display with the object, moving the object whilst maintaining contact between the object and the display, and terminating the user input by removing contact between the object and the display.

The program may be a software application for a portable electronic device.

According to various, but not necessarily all, embodiments of the invention there is provided a computer program that, when run on a computer, performs a method as described in any of the preceding paragraphs.

According to various, but not necessarily all, embodiments of the invention there is provided an apparatus comprising: means for controlling display of a graphical user interface, the graphical user interface including a portion configured to present content associated with a program; means for controlling display of a plurality of functions in response to a user input, the plurality of functions being associated with the program and being displayed in the graphical user interface with the portion; and means for determining if the user input selects a function of the plurality of functions for execution.

BRIEF DESCRIPTION

For a better understanding of various examples of embodiments of the present invention reference will now be made by way of example only to the accompanying drawings in which.

DETAILED DESCRIPTION

In the following description and in the figures, the wording 'connect' and 'couple', their derivatives, and their illustration in the figures means operationally connected or coupled. It should be appreciated that any number or combination of intervening components can exist (including no intervening components).

Figure 1:
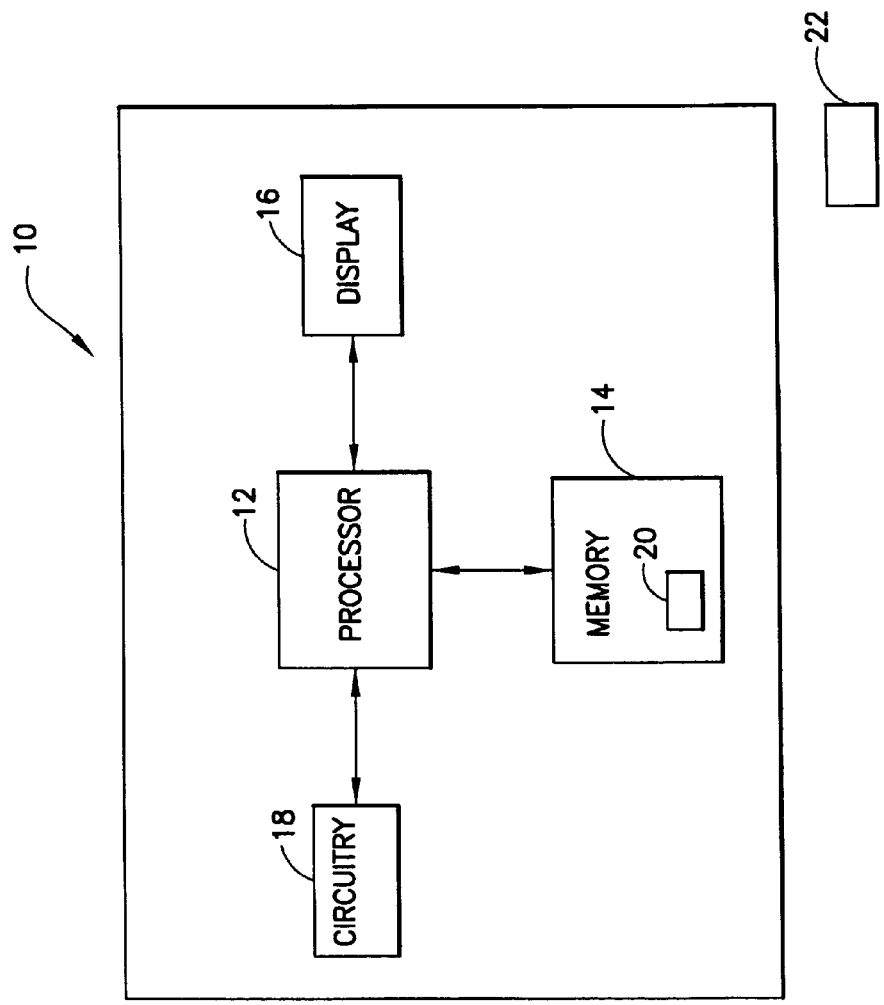
FIG. 1 illustrates a schematic diagram of an apparatus according to various embodiments of the invention.

FIG. 1 illustrates an apparatus 10 comprising: at least one processor 12; and at least one memory 14 including computer program code 20; the at least one memory 14 and the computer program code 20 configured to, with the at least one processor 12, cause the apparatus 10 at least to perform: controlling display of a graphical user interface 36, the graphical user interface 36 including a portion 38 configured to present content 40 associated with a program; controlling display of a plurality of functions 58, 60, 62 in response to a user input, the plurality of functions 58, 60, 62 being associated with the program and being displayed in the graphical user interface 36 with the portion 38; and determining if the user input selects a function of the plurality of functions 58, 60, 62 for execution.

In more detail, FIG. 1 illustrates an apparatus 10 according to various embodiments of the invention. The apparatus 10 comprises one or more processors 12, one or more memories 14, a display 16 and circuitry 18.

The apparatus 10 may be any electronic device and may be a portable electronic device (for example, a mobile cellular telephone, a tablet computer, a laptop computer, a personal digital assistant or a hand held computer), a non-portable electronic device (for example, a desktop computer or an automated teller machine (ATM)), or a module for such devices. As used here, 'module' refers to a unit or apparatus that excludes certain parts or components that would be added by an end manufacturer or a user.

The implementation of the processor 12 can be in hardware alone (a circuit for example), have certain aspects in software including firmware alone or can be a combination of hardware and software (including firmware).

The processor 12 may be implemented using instructions that enable hardware functionality, for example, by using executable computer program instructions in a general-purpose or special-purpose processor that may be stored on a computer readable storage medium (disk, memory and so on) to be executed by such a processor.

The processor 12 is configured to read from and write to the memory 14. The processor 12 may also comprise an output interface via which data and/or commands are output by the processor 12 and an input interface via which data and/or commands are input to the processor 12.

The memory 14 may be any suitable memory and may be a hard disk drive or solid state memory for example. The memory 14 stores a computer program 20 comprising computer program instructions that control the operation of the apparatus 10 when loaded into the processor 12. The computer program instructions 20 provide the logic and routines that enables the apparatus 10 to perform the method illustrated in FIG. 2. The processor 12 by reading the memory 14 is able to load and execute the computer program 12.

Although the memory 14 is illustrated as a single component it may be implemented as one or more separate components some or all of which may be integrated/removable and/or may provide permanent/semi-permanent/dynamic/cached storage.

The computer program 20 may arrive at the apparatus 10 via any suitable delivery mechanism 22. The delivery mechanism 22 may be, for example, a computer-readable storage medium, a computer program product, a memory device, a record medium such as a Blu-Ray disc (BD), a compact disc read-only memory (CD-ROM) or a digital versatile disc (DVD), an article of manufacture that tangibly embodies the computer program 20. The delivery mechanism 22 may be a signal configured to reliably transfer the computer program 20. The apparatus 10 may propagate or transmit the computer program 20 as a computer data signal.

The display 16 is configured to receive and display data from the processor 12. The processor 12 may read data from the memory 14 and provide the data to the display 16 for display to a user of the apparatus 10. The display 16 may be any suitable display and may be, for example, a thin film transistor (TFT) display, a liquid crystal display (LCD), an electrophoretic ink display, a light emitting diode (LED) display, an organic light emitting diode (OLED) display or an active matrix organic light emitting diode (AMOLED).

In this embodiment, the display 16 is a touch screen display (for example, a resistive touch screen or a capacitive touch screen). The display 16 is configured to provide a signal to the processor 12 in response to a user input to the display 16. For example, an object (such as a user's finger or a stylus for example) may contact the display 16 at a particular location and the display 16 then provides a signal to the processor 16 enabling the processor 12 to determine the location of the user input on the display 16. In another example, the display 16 may be configured to provide a signal to the processor 12 in response to an object moving within a predetermined distance of the display 16 without requiring the object to touch the display 16 (that is, the display 16 may provide a signal in response to an object hovering over the display 16)

The circuitry 18 includes additional circuitry of the apparatus 10. For example, where the electronic device 10 is a portable electronic device, the circuitry 18 may include input/output devices such as an audio input device (a microphone for example), an audio output device (a loudspeaker for example), a user input device such as a keypad, one or more cameras, radio communication circuitry (a transceiver for example) and an antenna arrangement.

Figure 2:
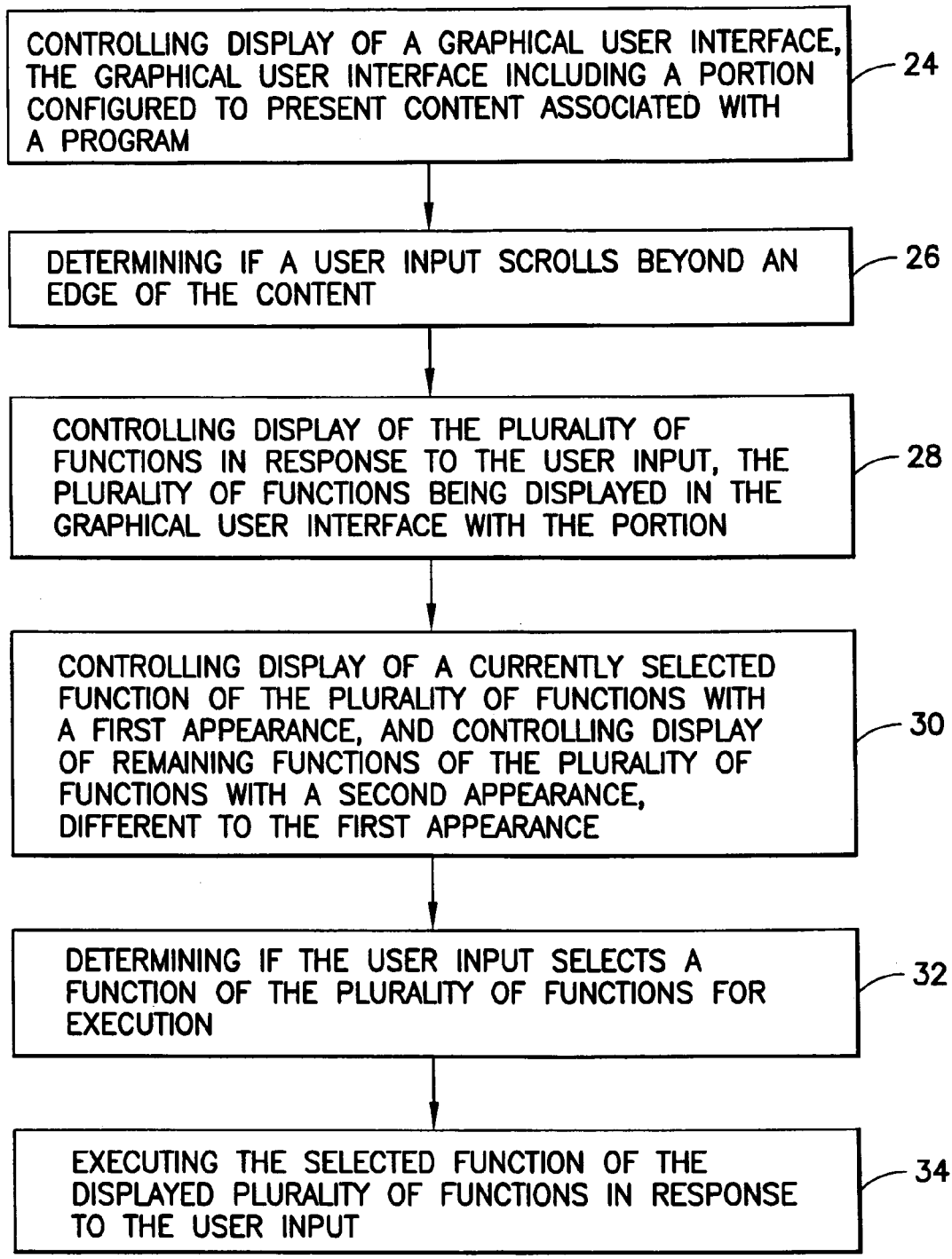
FIG. 2 illustrates a flow diagram of a method according to various embodiments of the invention.

FIG. 2 illustrates a flow diagram of a method according to various embodiments of the invention.

Figure 3:
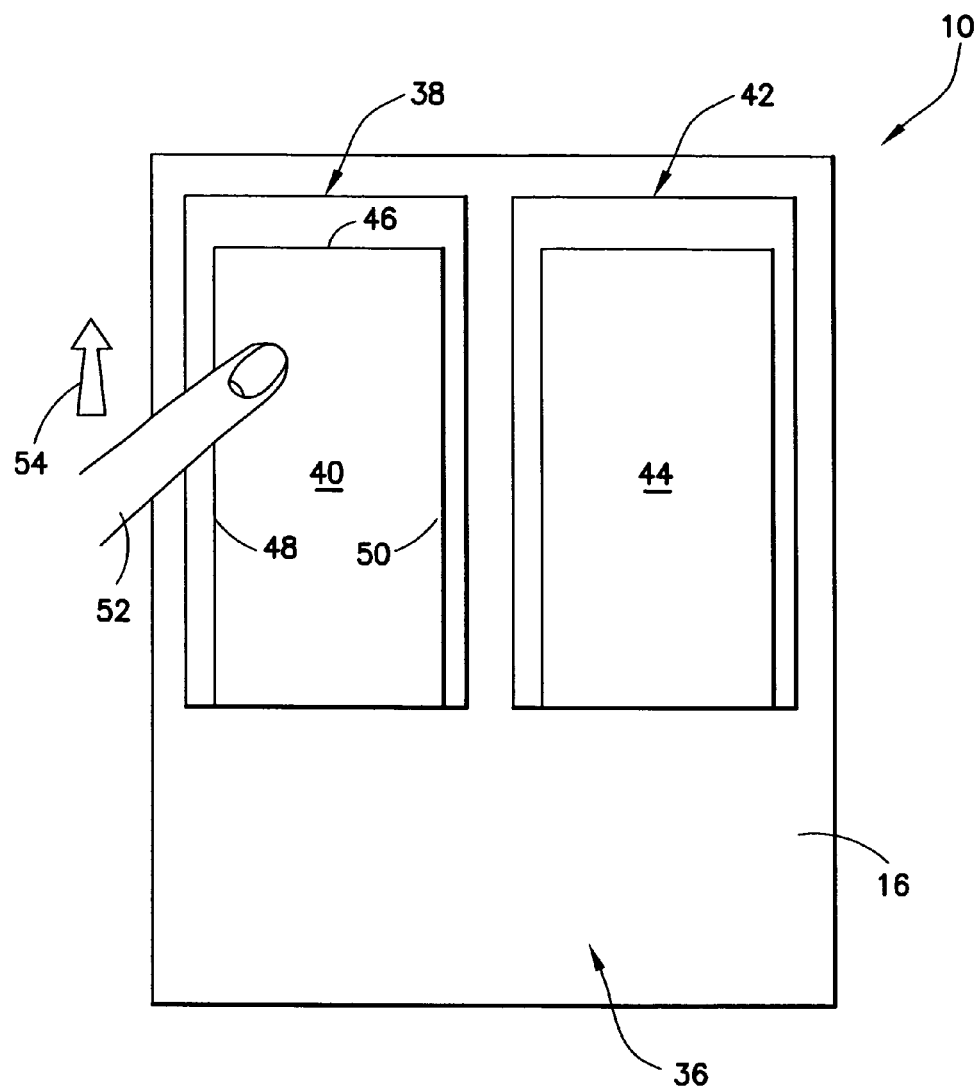
FIG. 3 illustrates a schematic diagram of a graphical user interface in a first configuration according to various embodiments of the present invention.

At block 24, the method includes controlling display of a graphical user interface 36 on the display 16 as illustrated in FIG. 3. The graphical user interface 36 includes a first portion 38 that is configured to present first content 40 associated with a first program, and a second portion 42 that is configured to present second content 44 associated with a second program.

In some embodiments, the graphical user interface 36 may be the root user interface of the apparatus 10. That is, the graphical user interface 36 may be the first displayable layer of a plurality of linked displayable layers of the user interface from which some or all programs of the apparatus 10 may be accessed. For example, the graphical user interface 36 may be a 'home screen' of the apparatus 10.

The first and second portions 38, 42 may be considered as panels within the graphical user interface 36 and are rectangular in this embodiment. It should be appreciated that the first and second portions 38, 42 may have any shape and may be square or circular for example.

It should be appreciated that in some embodiments, the graphical user interface 36 may not include any portions other than the first portion 38 and the first portion 38 may occupy a subset or the whole of the graphical user interface 36. In other embodiments, the graphical user interface 36 may include any number of portions associated with different programs.

The first and second programs may be any software applications and may be specially programmed for portable electronic devices. For example, the first and second programs may be any of: a social networking application such as Facebook™ or Twitter™, a business networking application such as LinkedIn™ or ZoomInfo™, a contacts application, a call register application, a calendar application, a news application, a music or video player application, an image editing application, or a weather application.

The first and second content 40, 44 may be any content associated with the first and second programs respectively and may include text, images and/or video. For example, where the first program is a social networking application, the first content 40 may include a plurality of news updates from contacts of the user. Each news update may include the contacts name (text), the contacts photograph (an image) and the news update itself (text). The first and second content 40, 44 may be, or include functions associated with the first and second programs respectively. The functions may be any command or option that are user selectable and cause the program to carry out an action. For example, where the first program is a music player application, the first content 40 may include functions such as 'play', 'rewind', 'fast forward', 'skip to previous music track' and 'skip to next music track'.

The first and second content 40, 44 are bound within the first and second portions 38, 42 respectively by edges. For example, the first content 40 has a top edge 46, a left edge 48, a right edge 50 and a bottom edge (not illustrated in the figure). FIG. 3 illustrates the graphical user interface 36 in an arrangement where the top edge 46 of the first content 40, 44 is positioned at the top of the first portion 38.

A user of the apparatus 10 may interact with the graphical user interface 36 using an object 52 such as a digit (for example, a finger or a thumb) or a stylus. For example, a user may contact the display 16 with the object 52 and move the object 52 upwards in the direction indicated by arrow 54 while maintaining contact with the display 16. The display 16 provides the user input signal to the processor 12 which in turn controls the display 16 so that the first content 40 is moved upwards within the first portion 38 (that is, the user scrolls downwards through the first content 40) and thus enables the user to view a portion of the content that was previously not displayed.

Figure 4:
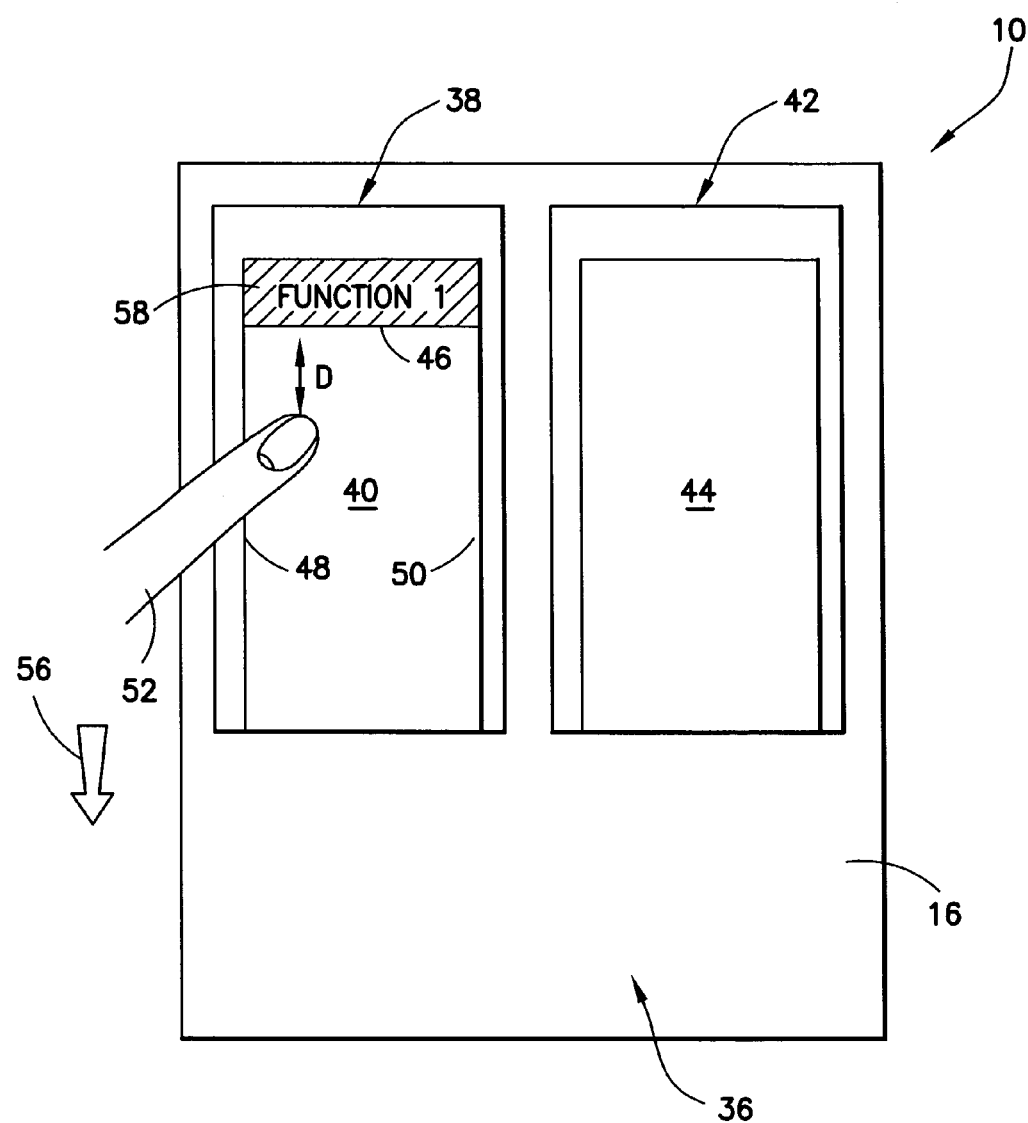
FIG. 4 illustrates a schematic diagram of the graphical user interface in a second configuration according to various embodiments of the present invention.

As illustrated in FIG. 4, a user may also contact the display 16 with the object 52 and move the object 52 downwards in the direction indicated by arrow 56 while maintaining contact with the display 16. The display 16 provides the user input signal to the processor 12 which in turn controls the display 16 so that the first content 40 is moved downwards within the first portion 38 (that is, the user scrolls upwards through the first content 40).

At block 26, the method includes determining if the user input scrolls beyond an edge of the first content 40. In FIG. 4 for example, the processor 12 determines from the user input signal that the object 52 has moved downwards and that the user input has scrolled beyond the top edge 46 of the first content 40 (that is, the user input has scrolled beyond the arrangement illustrated in FIG. 3). The processor 12 then controls the display of a first function 58 in the graphical user interface 36 with the first portion 38.

It should be appreciated that the processor 12 may determine that the user input has scrolled beyond any edge (for example, the right edge 50) and control the display of functions in the graphical user interface 36 at any location.

The first function 58 is associated with the first program and may be any option or command of the first program. For example, where the first program is a social networking application, the first function 58 may be an option that enables a user to post a news update and may be called "New Post" or have similar wording. By way of another example, the first function 58 may be an option that enables a user to refresh the first content 40 displayed in the first portion and may be called "Refresh". By way of a further example, the first function 58 may be an option to mark all contact's news posts in the first content 40 as read. The first function 58 may also be associated with the first program in that it may be an option or command in relation to the first portion 38. For example, the first function 58 may be an option that enables a user to load settings for the first portion 38 (such as the size of the portion, the color of the portion, the frequency at which the first content 40 is automatically updated) and may be called "Panel Settings".

In various embodiments, the processor 12 may receive the user input signal from the display 16 and determine the distance travelled by the object 52 on the display 16 and the direction of movement. If the user input scrolls beyond an edge of the first content 40 equal to or greater than a predetermined amount (corresponding to a distance d on the display 16 as illustrated in FIG. 4), the processor 12 controls the display of the first function 58 in the graphical user interface 36.

Figure 5:
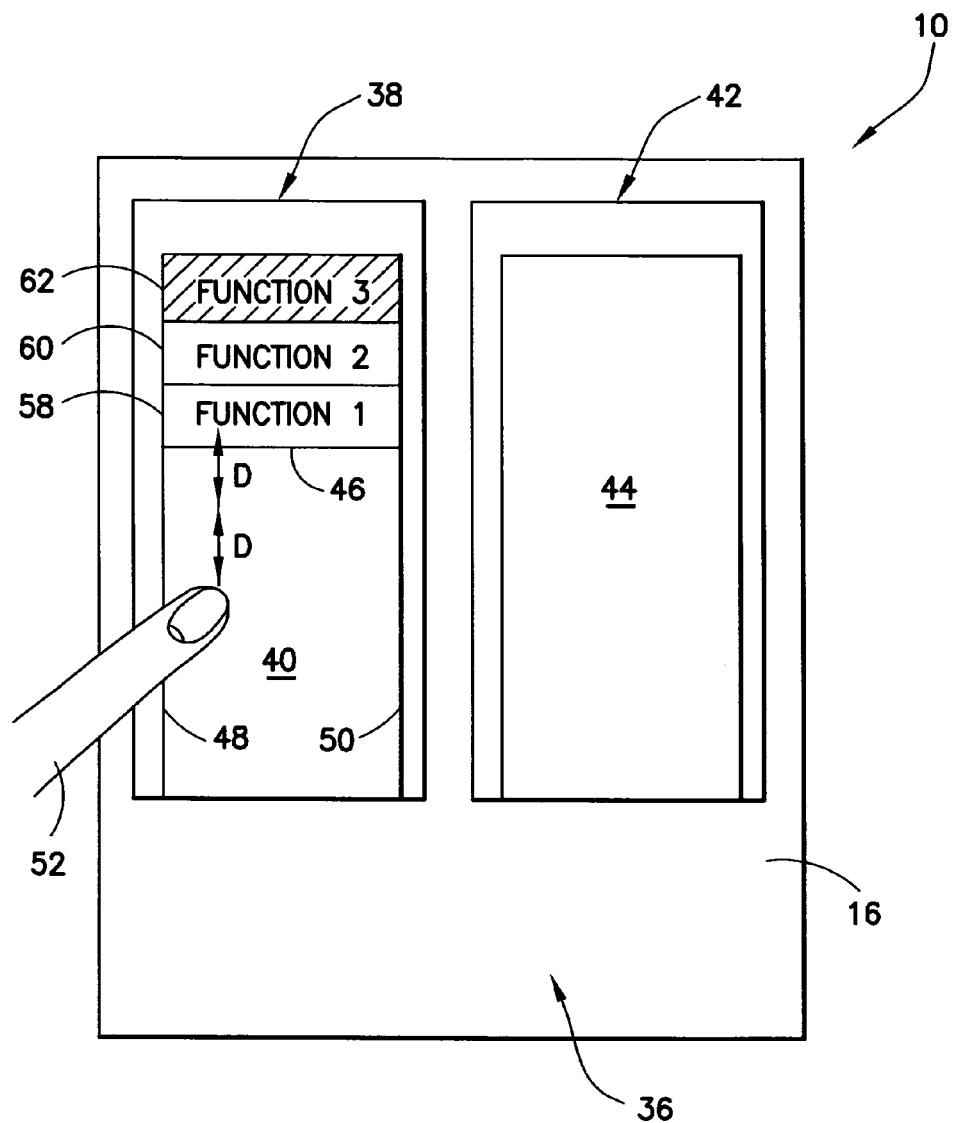
FIG. 5 illustrates a schematic diagram of a graphical user interface in a first configuration according to various embodiments of the present invention.

If the object 52 is moved downward from the position illustrated in FIG. 4 whilst contact is maintained with the display 16 (that is, the user continues to scroll beyond the top edge 46 of the first content 40), the method moves to block 28 and the processor 12 controls the sequential display of a second function 60 and then a third function 62 (and so on) in the graphical user interface 36 along with the first function 58, as illustrated in FIG. 5. Thus, a plurality of functions 58, 60, 62 associated with the first program are displayed within the graphical user interface 36.

As illustrated in FIG. 5, the plurality of functions 58, 60, 62 may be displayed within the first portion 38 in the space vacated by the first content 40 as it is scrolled. In other embodiments, the plurality of functions may be displayed only partially within the first portion 38 or may be displayed wholly outside the first portion 38.

In various embodiments, the processor 12 may receive the user input signal from the display 16 and determine the distance travelled by the object 52 on the display 16 and the direction of movement from the position illustrated in FIG. 4. If the user input continues to scroll beyond an edge of the first content 40 equal to or greater than a predetermined amount d relative to the position illustrated in FIG. 4, the processor 12 controls the display of the second function 60 in the graphical user interface 36. If the user input continues to scroll beyond an edge of the first content 40 equal to or greater than a predetermined amount of two times d relative to the position illustrated in FIG. 4, the processor 12 controls the display of the third function 62 in the graphical user interface 36.

It may be considered that in FIG. 3, the first, second and third functions 58, 60, 62 are hidden above the top edge 46 of the first content 40 and that moving the object 52 downwards on the display 16 scrolls the first, second and third functions 58, 60, 62 sequentially into view within the first portion 38.

At block 30, the method includes controlling display of a currently selected function of the plurality of functions 58, 60, 62 with a first appearance, and controlling display of the remaining functions of the plurality of functions 58, 60, 62 with a second appearance, different to the first appearance. In various embodiments, the currently selected function is the function that was last displayed in the graphical user interface 36. Consequently, in FIG. 4, the first function 58 is the function that was last displayed, and in FIG. 5, the third function 62 is the function that was last displayed.

As illustrated in FIG. 5, the third function 62 is highlighted relative to the first and second functions 58, 60 and therefore has a different appearance to the first and second functions 58, 60. For example, the third function 62 may have a blue background color, whereas the first and second functions 58, 60 may have a black background color.

At block 32, the method includes determining if the user input selects a function of the plurality of functions 58, 60, 62 for execution.

In some embodiments, the processor 12 determines if the user selects a function by determining if the user input has been terminated (that is, the object 52 has been moved away from the display 16 so that it no longer contacts the display 16 and therefore no user input signal is provided to the processor 12). If the user input has been terminated, the processor 12 determines which function was last selected (that is, the function that last had the first appearance, such as the third function 62 illustrated in FIG. 5).

In other embodiments, the processor 12 determines if the user selects a function by determining if the duration of the user input has exceeded a predetermined threshold time while selecting a single function.

In other embodiments, the processor 12 determines if the user selects a function by determining if the direction of movement of the user input changes for a currently selected function. For example, the processor 12 may control the display of a plurality of functions in response to a vertical movement (as illustrated in FIGS. 3 to 5) and may determine that a function has been selected in response to a horizontal movement that moves beyond a predetermined distance.

At block 34, the method includes executing the selected function of the plurality of functions 58, 60, 62 in response to the user input. For example, where the selected function is a "New Post" of a social networking application, the processor 12 executes the "New Post" function and controls the display 16 to display an interface that enables a user to enter a new post.

It should be appreciated that the method illustrated in FIG. 2 may also be performed for other portions (such as the second portion 42) in the graphical user interface 36. Where the display 16 is a 'multi-touch' touch screen, the method illustrated in FIG. 2 may be performed simultaneously for two or more portions in the graphical user interface.

Various embodiments provide an advantage in that a user may perform a single gesture to perform the method illustrated in FIG. 2 and described in the preceding paragraphs. As described above, the single gesture may include contacting the display 16 with the object 52, moving the object 52 whilst maintaining contact between the object 52 and the display 16, and terminating the user input by removing contact between the object 52 and the display 16. The single gesture may be relatively intuitive and simple for a user and may advantageously enable the apparatus 10 to be used by large section of society (including children and the elderly who may be relatively inexperienced at using such apparatus).

Various embodiments also provide an advantage in that since the currently selected function has a different appearance to the remaining functions, the user may easily determine which function will be executed once they complete the single gesture. This may once again render the apparatus 10 relatively intuitive and simple for a user to operate.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

The blocks illustrated in the FIG. 4 may represent steps in a method and/or sections of code in the computer program 20. The illustration of a particular order to the blocks does not necessarily imply that there is a required or preferred order for the blocks and the order and arrangement of the block may be varied. For example, block 30 may be performed simultaneously with block 28. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, in other embodiments, the plurality of functions 58, 60, 62 may not be displayed sequentially, but may be displayed simultaneously. In these embodiments, the processor 12 determines from the user input signal that the object 52 has moved downwards and that the user input has scrolled beyond the top edge 46 of the first content 40 (that is, the user input has scrolled beyond the arrangement illustrated in FIG. 3). The processor 12 then controls the display of a plurality of functions simultaneously in the graphical user interface 36 with the first portion 38. The user may select a function of the plurality of functions by moving the object 52 so that it overlays a desired function and then removing the object 52 from contact with the display 16 to execute the desired function. The processor 12 may control the graphical user interface 36 so that the position of the first content 40 is locked in response to the plurality of functions being displayed so that the object 52 does not cause the first content 40 to be scrolled when the object 52 is moved to select a function.

Furthermore, in other embodiments, a user may interact with the graphical user interface 36 by hovering an object over the display 16 or by using a user input device other than a touch screen display. For example, a user may operate a computer mouse to control a cursor on the display 16 and the user may cause the display and selection of a function by moving the cursor over the first content 40, pressing a mouse button, moving the mouse to cause the first content 40 to scroll downwards and cause the display of the plurality of functions, and releasing the mouse button to execute a selected function.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:
1. A method comprising:
controlling display on a graphical user interface of a plurality of functions in response to a single gesture user input, such that each function of the plurality of functions is sequentially scrolled into view and displayed, on a portion of the graphical user interface at which content associated with an application program is simultaneously displayed, in response to each sequential scrolling of the single gesture user input by a predetermined distance d in a scrolling direction by which a next one of the plurality of functions is fully displayed on the graphical user interface,
wherein each different function of the plurality of functions causes the application program to carry out a different action;
in response to determining that a user has selected one of the plurality of functions, controlling display of the selected function of the plurality of functions with a first appearance on the graphical user interface, and controlling display of remaining functions of the plurality of functions that are simultaneously displayed on the graphical user interface with a different second appearance, wherein determining that the user has selected one of the plurality of functions is based on at least one of:

an extent of the single gesture user input along the scrolling direction, such that whichever of the plurality of functions that was fully displayed most recently on the graphical user interface is the selected function;

a duration of the single gesture user input relative to a predetermined time; and the single gesture user input moving in another direction different from the scrolling direction; and causing the selected function of the plurality of functions having the first appearance on the graphical user interface to execute in response to determining that the single gesture user input is terminated.

2. A method as claimed in claim 1, wherein the graphical user interface includes one or more other portions configured to present content associated with other application programs different from any of the plurality of functions.

3. A method as claimed in claim 1, wherein the method is executed by a software application running in a portable electronic device comprising the graphical user interface.

4. The method according to claim 1, wherein determining that the user has selected one of the plurality of functions is based on the extent of the single gesture user input along the scrolling direction.

5. The method according to claim 1, wherein determining that the user has selected one of the plurality of functions is based on a duration of the single gesture user input relative to a predetermined time.

6. The method according to claim 1, wherein determining that the user has selected one of the plurality of functions corresponds to the single gesture user input moving in another direction different from the scrolling direction.

7. The method according to claim 1, wherein the single gesture user input includes contacting the graphical user interface with an object, moving the object while maintaining contact between the object and the graphical user interface, and terminating the single gesture user input by removing contact between the object and the graphical user interface.

8. The method according to claim 1, wherein the said portion is a first portion, the single gesture user input comprises a first single gesture user input, the plurality of functions comprises a first plurality of functions, the graphical user interface comprises a multi-touch screen that includes the first portion and a different second portion, and the method further comprises:

controlling display on the second portion of the graphical user interface of a second plurality of functions in response to a second single gesture user input simultaneous with the first single gesture user input, such that each function of the second plurality of functions is sequentially scrolled into view and displayed on the second portion of the graphical user interface in response to each sequential scrolling of the second single gesture user input by the predetermined distance d in the scrolling direction.

9. The method according to claim 1, wherein for any integer value of n between one and the total number of functions in the plurality of functions, controlling display on the graphical user interface as said results in n of the functions being simultaneously displayed at the graphical user interface corresponding to the distance n*d that the single gesture user input is displaced along the scrolling direction.

10. An apparatus comprising:
at least one processor; and
at least one memory including computer program code, the at least one memory and the computer program code configured to, with the at least one processor, cause the apparatus at least to perform:

controlling display on a graphical user interface of a plurality of functions in response to a single gesture user input, such that each function of the plurality of functions is sequentially scrolled into view and displayed, on a portion of on the graphical user interface at which content associated with an application program is simultaneously displayed, in response to each sequential scrolling of the single gesture user input by a predetermined distance d in a scrolling direction by which a next one of the plurality of functions is fully displayed on the graphical user interface, wherein each different function of the plurality of functions causes the application program to carry out a different action;

in response to determining that a user has selected one of the plurality of functions, controlling display of the selected function of the plurality of functions with a first appearance on the graphical user interface, and controlling display of remaining functions of the plurality of functions that are simultaneously displayed on the graphical user interface with a different second appearance, wherein determining that the user has selected one of the plurality of functions is based on at least one of:

an extent of the single gesture user input along the scrolling direction, such that whichever of the plurality of functions that was fully displayed most recently on the graphical user interface is the selected function;

a duration of the single gesture user input relative to a predetermined time; and the single gesture user input moving in another direction different from the scrolling direction; and causing the selected function of the plurality of functions having the first appearance on the graphical user interface to execute in response to determining that the single gesture user input is terminated.

11. A portable electronic device comprising the apparatus and the graphical user interface as claimed in claim 10.

12. The apparatus according to claim 10, wherein determining that the user has selected one of the plurality of functions is based on the extent of the single gesture user input along the scrolling direction.

13. A non-transitory computer-readable storage medium encoded with instructions that, when executed by a processor, perform:

controlling display on a graphical user interface of a plurality of functions in response to a single gesture user input, such that each function of the plurality of functions is sequentially scrolled into view and displayed, on a portion of on the graphical user interface at which content associated with an application program is simultaneously displayed, in response to each sequential scrolling of the single gesture user input by a predetermined distance d in a scrolling direction by which a next one of the plurality of functions is fully displayed on the graphical user interface, wherein each different function of the plurality of functions causes the application program to carry out a different action;

in response to determining that a user has selected one of the plurality of functions, controlling display of the selected function of the plurality of functions with a first appearance on the graphical user interface, and controlling display of remaining functions of the plurality of functions that are simultaneously displayed on the graphical user interface with a different second appearance, wherein determining that the user has selected one of the plurality of functions is based on at least one of:

an extent of the single gesture user input along the scrolling direction, such that whichever of the plurality of functions that was fully displayed most recently on the graphical user interface is the selected function;

a duration of the single gesture user input relative to a predetermined time; and the single gesture user input moving in another direction different from the scrolling direction; and causing the selected function of the plurality of functions having the first appearance on the graphical user interface to execute in response to determining that the single gesture user input is terminated.

14. The non-transitory computer-readable storage medium as claimed in claim 13, wherein for any integer value of n between one and the total number of functions in the plurality of functions, controlling display on the graphical user interface as said results in n of the functions being simultaneously displayed at the graphical user interface corresponding to the distance n*d that the single gesture user input is displaced along the scrolling direction.

* * * * *